US005495769A

United States Patent [19]

Broden et al.

[11] Patent Number: 5,495,769

[45] Date of Patent: Mar. 5, 1996

[54] MULTIVARIABLE TRANSMITTER

[75] Inventors: David A. Broden, Chanhassen; Kelly M. Orth, Apple Valley; Dale W. Borgeson; Jane B. Lanctot, both of Minneapolis; Kevin D. Voegele, Shakopee, all of Minn.

[73] Assignee: Rosemount Inc., Eden Prairie, Minn.

[21] Appl. No.: 445,469

[22] Filed: May 22, 1995

Related U.S. Application Data

[63] Continuation of Ser. No. 117,479, Sep. 7, 1993, abandoned.

[51] Int. Cl.$^6$ .................... G01F 1/34

[52] U.S. Cl. .................... 73/718; 73/861.03

[58] Field of Search .................... 73/861.02, 861.03, 73/861.52, 861.22, 861.24, 718

[56] References Cited

U.S. PATENT DOCUMENTS

| | | | |
|---|---|---|---|
| 3,701,280 | 10/1972 | Stroman | 73/194 M |
| 3,745,827 | 7/1973 | Swanson et al. | 73/861.02 |
| 4,084,155 | 4/1978 | Herzl et al. | 73/861.22 |
| 4,123,940 | 11/1978 | Herzl et al. | 73/861.24 |
| 4,238,825 | 12/1980 | Geery | 364/510 |
| 4,419,898 | 12/1983 | Zanker et al. | 73/861.02 |
| 4,528,855 | 7/1985 | Singh | 73/721 |
| 4,562,744 | 1/1986 | Hall et al. | 73/861.02 |
| 4,598,381 | 7/1986 | Cucci | 364/558 |
| 4,677,841 | 7/1987 | Kennedy | 73/30 |
| 4,958,938 | 9/1990 | Schwartz et al. | 374/208 |
| 5,046,369 | 9/1991 | Boyd et al. | 73/861.03 |
| 5,146,941 | 9/1992 | Statler | 137/8 |
| 5,152,181 | 10/1992 | Lew | 73/861.02 |

FOREIGN PATENT DOCUMENTS

| | | | |
|---|---|---|---|
| 0063685 | 3/1982 | European Pat. Off. | G01F 23/14 |
| 0223300 | 5/1985 | European Pat. Off. | G01F 1/36 |
| 0214801 | 3/1987 | European Pat. Off. | G01F 23/14 |
| 9109176 | 9/1991 | Germany . | |
| WO88/01417 | 2/1988 | WIPO | G08C 19/10 |
| WO89/02578 | 3/1989 | WIPO | G01D 21/00 |
| WO89/04089 | 5/1989 | WIPO | H03M 1/00 |
| WO90/15975 | 12/1990 | WIPO | G01L 7/08 |
| WO91/18266 | 11/1991 | WIPO | G01F 23/14 |

OTHER PUBLICATIONS

"Single Chip Senses Pressure and Temperature", *Machine Design*, 64 (1992) May 21, No. 10.

"Precise Computerized In-Line Compressible Flow Metering" by G. L. Mustard, excerpt from *Flow Its Measurement and Control in Science and Industry*, pp. 539–540.

AccuRate Advanced Gas Flow Computer Model GFC 3308, Specification Summary by Bristol Babcock Inc. ®1992.

Teletrans 3508–10A Smart Pressure Transmitter, Specification Summary by Bristol Babcock Inc. ©1992.

Teletrans 3508–30A Smart Differential Pressure Transmitter, Specification Summary by Bristol Babcock Inc. ©1992.

*Natural Gas Engineering A Systems Approach* by Dr. Chi U. Ikoku published by PennWell Books, pp. 256 and 257.

"Development of an Integrated EFM Device for Orifice Meter Custody Transfer Applications" by S. Neiberle and J. Gregor, paper submitted at American Gas Association Distribution/Transmission Conference & Exhibit, May 19, 1993.

(List continued on next page.)

*Primary Examiner*—Richard Chilcot
*Assistant Examiner*—Harshad Patel
*Attorney, Agent, or Firm*—Westman, Champlin & Kelly

[57] ABSTRACT

In this invention, a multivariable transmitter providing an output representative of mass flow has a dual microprocessor structure. The first microprocessor compensates digitized process variables and the second microprocessor computes the mass flow as well as arbitrating communications between the transmitter and a master. In a second embodiment of the present invention, a first microprocessor compensates digitized process variables, a second microprocessor computes an installation specific physical parameter such as mass flow and a third microprocessor arbitrates real-time communications between the transmitter and a master.

7 Claims, 2 Drawing Sheets

OTHER PUBLICATIONS

Advertising for Bristol Babcock 3508 DP in *Control Engineering*, Dec. 1992.

Advertising for Bristol Babcock 3308 in *Control Engineering*, Dec. 1992.

"The Digitisation of Field Instruments," Van Der Bijl, *Journal A*, vol. 32, No. 3, pp. 62–65.

Instruction Manual CI–3308, Version 1.2., "AccuRate GFC 3308 Single Gas Flow Computer," published by Bristol Babcock, Watertown, CT., Dec. 1992.

"Smart Transmitters Tear Up The Market," C. Polsonetti, *INTECH Industry*, Jul. 1993, pp. 42–45.

MULTIVARIABLE TRANSMITTER

This is a continuation application of application Ser. No. 08/117,479, filed Sep. 7, 1993, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to a field mounted measurement transmitter measuring a process variable representative of a process, and more particularly, to such transmitters which have a microprocessor.

Measurement transmitters sensing two process variables, such as differential pressure on either side of an orifice in a pipe through which a fluid flow, and a relative pressure in the pipe, are known. The transmitters typically are mounted in the field of a process control industry installation where power consumption is a concern. Other measurement transmitters sense process grade temperature of the fluid. Each of the transmitters requires a costly and potentially unsafe intrusion into the pipe, and each of the transmitters consumes a maximum of 20 mA of current at 12 V. In fact, each intrusion into the pipe costs between two and seven thousand dollars, depending on the types of pipe and the fluid flowing within the pipe. There is a desire to provide measurement transmitters with additional process measurements, while reducing the number of pipe intrusions and decreasing the amount of power consumed.

Gas flow computers sometimes include pressure sensing means common to a measurement transmitter. Existing gas flow computers are mounted in process control industry plants for precise process control, in custody transfer applications to monitor the quantity of hydrocarbons transferred and sometimes at well heads to monitor the natural gas or hydrocarbon output of the well. Such flow computers provide an output representative of a flow as a function of three process variables and a constant containing a supercompressibility factor. The three process variables are the differential pressure across an orifice in the pipe containing the flow, the line pressure of the fluid in the pipe and the process grade temperature of the fluid. Many flow computers receive the three required process variables from separate transmitters, and therefore include only computational capabilities. One existing flow computer has two housings: a first housing which includes differential and line pressure sensors and a second transmitter-like housing which receives an RTD input representative of the fluid temperature. The temperature measurement is signal conditioned in the second housing and transmitted to the first housing where the gas flow is computed.

The supercompressibility factor required in calculating the mass flow is the subject of several standards mandating the manner and accuracy with which the calculation is to be made. The American Gas Association (AGA) promulgated a standard in 1963, detailed in "Manual for the Determination of Supercompressibility Factors for Natural Gas", PAR Research Project NX-19. In 1985, the AGA introduced another guideline for calculating the constants, AGA8 1985, and in 1992 promulgated AGA8 1992 as a two part guideline for the same purpose. Direct computation of mass flow according to these guidelines, as compared to an approximation method, requires many instruction cycles resulting in slow update times, and a significant amount of power consumption. In many cases, the rate at which gas flow is calculated undesirably slows down process loops. Cumbersome battery backup or solar powered means are required to power these gas flow computers. One of the more advanced gas flow computers consumes more than 3.5 Watts of power.

There is thus a need for an accurate field mounted multivariable measurement transmitter connected with reduced wiring complexity, operable in critical environments, with additional process grade sensing capability and fast flow calculations, but which consumes a reduced amount of power.

SUMMARY OF THE INVENTION

In this invention, a two wire process control transmitter has a sensor module housing having at least one sensor which senses a process variable representative of the process. The sensor module also includes an analog to digital converter for digitizing the sensed process variable. A first microprocessor in the sensor module compensates the digitized process variable with output from a temperature sensor in the transmitter housing. The sensor module is connected to an electronics housing, which includes a set of electronics connected to the two wire circuit and including a second microprocessor which computes the physical parameter as a function of the compensates process variable and has output circuitry for formatting the physical parameter and coupling the parameter onto the two wires. In a preferred embodiment of the present invention, the physical parameter is mass flow, and the sensor module housing includes a differential pressure sensor, an absolute pressure sensor for sensing line pressure and a circuit for receiving an uncompensated output from a process grade temperature measurement downstream from the differential pressure measurement. In this dual microprocessor embodiment of the present invention, the first microprocessor compensated sensed process variables and the second microprocessor provides communications and installation specific computation of the physical parameter. In an alternate embodiment, a third microprocessor in the electronics housing provides communications arbitration for advanced communications protocols.

DETAILED DESCRIPTION OF THE PREFERRED EMBODIMENTS

Figure 1:
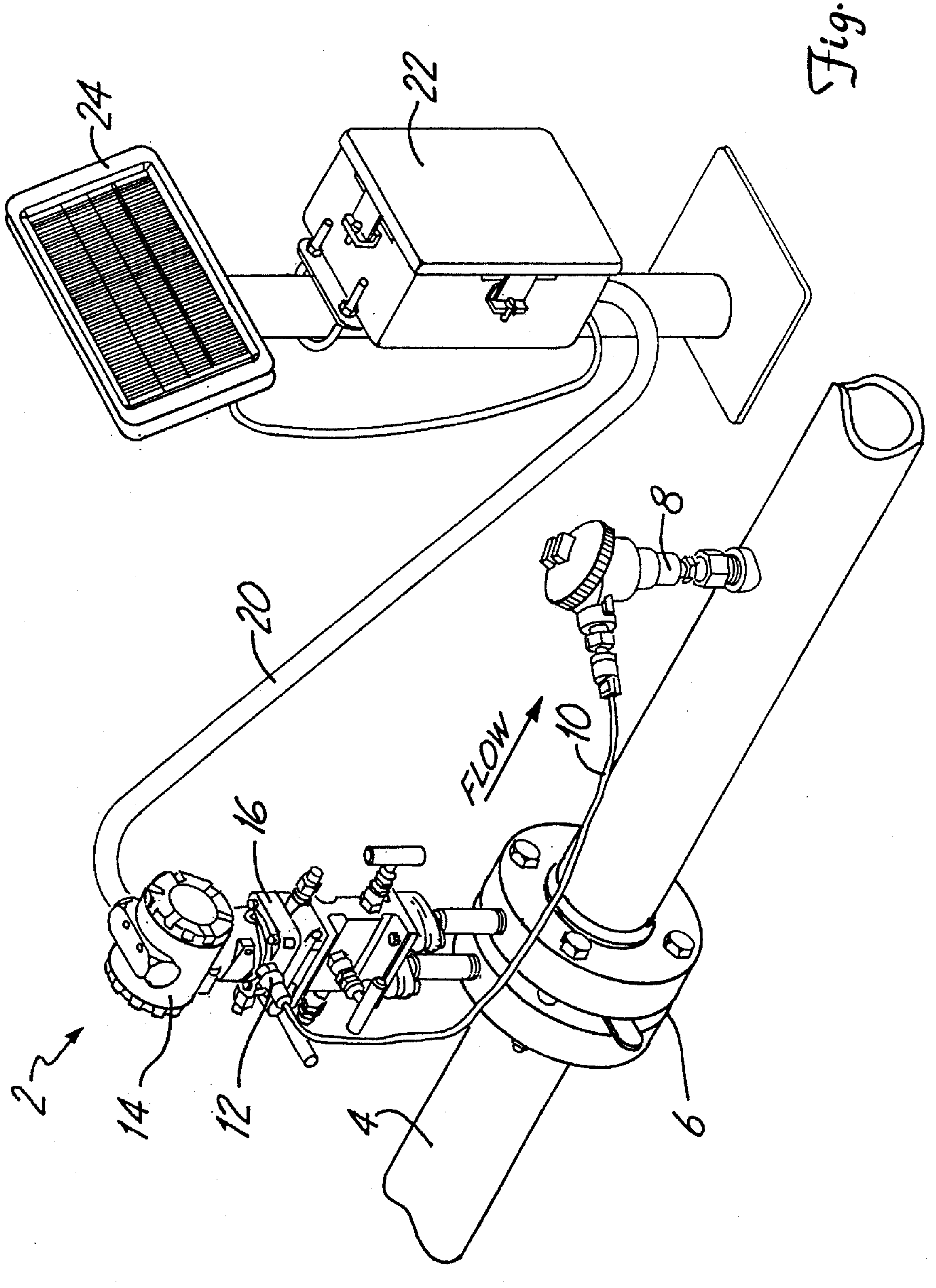
FIG. 1 is a drawing of the present invention connected to a pipe for sensing pressures and temperature therein.

FIG. 1 shows a multivariable transmitter 2 mechanically coupled to a pipe 4 through a pipe flange 6. A flow, Q, of natural gas flows through pipe 4. A temperature sensor 8 such as a 100 ohm RTD, senses a process grade temperature downstream from the flow transmitter 2. The analog sensed temperature is transmitted over a cable 10 and enters transmitter 2 through an explosion proof boss 12 on the transmitter body. Transmitter 2 senses differential pressure, absolute pressure and receives an analog process temperature input, all within the same housing. The transmitter body includes an electronics housing 14 which screws down over threads in a sensor module housing 16. Transmitter 2 is connected to pipe 4 via a standard three or five valve manifold. When transmitter 2 is connected as a gas flow computer at a remote site, wiring conduit 20, containing two wire twisted pair cabling, connects output from transmitter 2 to a battery box 22. Battery box 22 is optionally charged by a solar array 24. In operation as a data logging gas flow computer, transmitter 2 consumes approximately 8 mA of current at 12 V, or 96 mW. When transmitter 2 is configured as a high performance multivariable transmitter using a suitable switching power supply, it operates solely on 4–20 mA of current without need for battery backup. The switching regulator circuitry ensures that transmitter 2 consumes less than 4 mA.

Figure 2:
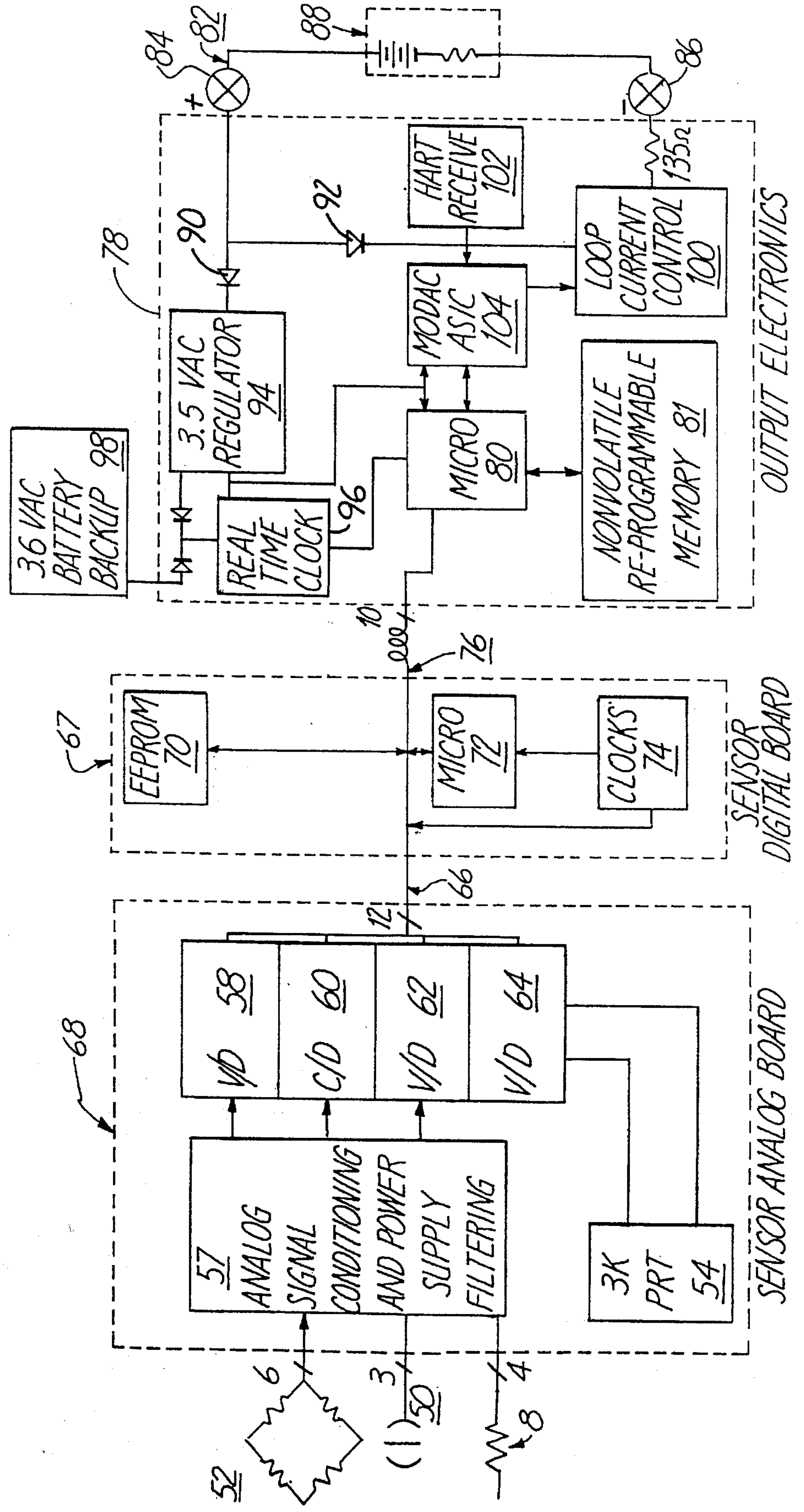
FIG. 2 is a block drawing of the electronics of the present invention.

In FIG. 2, a metal cell capacitance based differential pressure sensor 50 senses the differential pressure across an orifice in pipe 4. Alternatively, differential pressure may be sensed using a venturi tube or an annular. A silicon based strain gauge pressure sensor 52 senses the line pressure of the fluid in pipe 4, and 100 ohm RTD sensor 8 senses the process grade temperature of the fluid in pipe 4 at a location downstream from the differential pressure measurement. The uncompensated analog output from temperature sensor 8 is connected to transmitter 2 via cabling 10. Compensating output from sensor 8 in sensor module housing 16 minimizes the error in compensation between process variables and consumes less power, since separate sets of compensation electronics would consume more power than a single set. It is preferable to sense differential pressure with a capacitance based sensor since such sensors have more sensitivity to pressure (and hence higher accuracy) than do strain gauge sensors. Furthermore, capacitance based pressure sensors generally require less current than strain gauge sensors employ in sensing the same pressure. For example, a metal cell differential pressure sensor typically consumes 500 microamps while a piezoresistive differential pressure sensor typically consumes 1000 microamps. However, strain gauge sensors are preferred for absolute pressure measurements, since the absolute pressure reference required in a line pressure measurement is more easily fabricated in strain gauge sensors. Throughout this application, a strain gauge sensor refers to a pressure sensor having an output which changes as a function of a change in resistance. Sensors having a frequency based output representative of the sensed process variable may also be used in place of the disclosed sensors. A low cost silicon based PRT 54 located on a sensor analog board 68 senses the temperature proximate to the pressure sensors 50,52 and the digitized output from sensor 56 compensates the differential and the line pressure. Analog signal conditioning circuitry 57 filters output from sensors 8,50 and 52 and also filters supply lines to the A/D circuits 58–64. Four low power analog to digital (A/D) circuits 58–64 appropriately digitize the uncompensated sensed process variables and provide four respective 16 bit wide outputs to a shared serial peripheral interface bus (SPI) 66 at appropriate time intervals. A/D circuits 58–64 are voltage or capacitance to digital converters, as appropriate for the input signal to be digitized, and are constructed according to U.S. Pat. Nos. 4,878,012, 5,083,091, 5,119,033 and 5,155,455, assigned to the same assignee as the present invention. Circuitry 57, PRT 54 and A/D circuits 58–64 are physically situated on analog sensor board 68 located in sensor housing 16.

The modularity of the present invention, configured either as a mass flow computer or as a multivariable transmitter, allows lower costs, lower power consumption, ease of manufacture, interchangability of circuit boards to accommodate various communications protocols, smaller size and lower weight over prior art flow computers. In the present invention, all raw uncompensated process variables signals are received at sensor module housing 16, which also includes a dedicated microprocessor 72 for compensating those process variables. A single bus 76 communicates compensated process variables between the sensor housing and electronics housing 14, so as to minimize the number of signals between the two housings and therefore reduce capacitance and power consumption. A second microprocessor in the electronics housing computes installation specific parameters as well as arbitrating communications with a master. For example, one installation specific physical parameter is mass flow when transmitter 2 is configured as a gas flow transmitter. Alternatively, transmitter 2 includes suitable sensors and software for turbidity and level measurements when configured as an analytical transmitter. Finally, pulsed output from vortex or turbine meters can be input in place of RTD input and used in calculating mass flow. In various embodiments of the present multivariable transmitter invention, combinations of sensors (differential, gauge, and absolute pressure, process grade temperature and analytical process variables such as gas sensing, pH and elemental content of fluids) are located and are compensated in sensor module housing 16. A serial bus, such as an SPI or a $I^2C$ bus, communicates these compensated process variables over a cable to a common set of electronics in electronics housing 14. The second microprocessor located in electronics housing 14 provides application specific computations, but the structure of the electronics is unchanged; only software within the two microprocessors is altered to accommodate the specific application.

Before manufacturing transmitter 2, pressure sensors 50,52 are individually characterized over temperature and pressure and appropriate correction constants are stored in electrically erasable programmable read only memory (EEPROM) 70. Microprocessor 72 retrieves the characterization constants stored in EEPROM 70 and uses known polynomial curve fitting techniques to compensate the digitized differential pressure, relative pressure and process grade temperature. Microprocessor 72 is a Motorola 68HC05C8 processor operating at 3.5 volts in order to conserve power. The compensated process variable outputs from microprocessor 72 connect to a bus 76 to an output electronics board 78, located in electronics housing 14. Bus 76 includes power signals, 2 handshaking signals and the three signals necessary for SPI signalling. When transmitter 2 incorporates flow computer software, both differential and line pressure is compensated by the digitized output from the temperature sensor 54, but the differential pressure is compensated for zero shift by the line pressure. For high performance multivariable configurations, the line pressure is compensated by the differential pressure measurement. However, when transmitter 2 is configured as a high performance multivariable transmitter, differential and line pressure is compensated by the digitized output from the temperature sensor 8 and differential pressure is compensated by the line pressure measurement. A clock circuit 74 on sensor digital board 67 provides clock signals to microprocessor 72 and to the A/D circuits 58–64 over a 12 bit bus 66 including an SPI. A serial bus, such as the SPI bus, is preferred for use in a compact low power application such as a field mounted transmitter, since serial transmission requires less power and less signal interface connections than a parallel transmission of the same information.

A Motorola 68HC11F1 microprocessor 80 on output circuit board 78 arbitrates communications requests which transmitter 2 receives over a two wire circuit 82. When configured as a flow computer, transmitter 2 continually updates the computed mass flow. All the mass flow data is logged in memory 81, which contains up to 35 days worth of data. When memory 81 is full, the user connects the gas flow computer to another medium for analysis of the data. When configured as a multivariable transmitter, transmitter 2 provides the sensed process variables, which includes as appropriate differential pressure, gauge pressure, absolute pressure and process grade temperature.

The dual microprocessor structure of transmitter 2 doubles throughput compared to single microprocessor units having the same computing function, and reduces the possibility of aliasing. In transmitter 2 the sensor microprocessor provides compensated process variables while the electronics microprocessor simultaneously computes the mass flow using compensated process variables from the previous 56 mS update period. Furthermore, a single microprocessor unit would have sampled the process variables half as often as the present invention, promoting unwanted aliasing.

Microprocessor 80 also calculates the computation intensive equation for mass flow, given in AGA3 part 3, eq 3.3

$$q_m = 590.006\ C_d E_V y_1 d^2 \frac{\sqrt{Z_S g_r P_l h_w}}{Z_{fl} T_f}$$

where $C_d$ is the discharge coefficient, $E_V$ is the velocity of approach factor, $y_1$ is the expansion of gas factor as calculated downstream, d is the orifice plate bore diameter, $Z_S$ is the gas compressibility factor at standard condition, $g_r$ is the real gas relative density, $P_l$ is the line pressure of the gas in the pipe, $h_W$ is the differential pressure across the orifice, $Z_{fl}$ is the compressibility at the flowing condition and $T_f$ is the process grade temperature. Computation of mass flow is discussed in co-pending patent application, U.S. patent application Ser. No. 08/124,246, filed Sep. 20, 1994, now abandoned. Non-volatile flash memory 81 has a capacity of 128 k bytes which stores up to 35 days worth of mass flow information. A clock circuit 96 provides a real time clock signal having a frequency of approximately 32 kHz, to log absolute time corresponding to a logged mass flow value. Optional battery 98 provides backup power for the real time clock 96. When transmitter 2 is configured as a multivariable transmitter, the power intensive memory 81 is no longer needed, and the switching regulator power supply is obviated.

When flow transmitter 2 communicates according to real time communications protocols such as ISP or FIP, a third microprocessor in circuit 104 in the electronics housing provides communications arbitration for advanced communications protocols. This triple microprocessor structure allows for one microprocessor compensating digitized process variables in the sensor module housing, a second microprocessor in the electronics housing to compute a physical parameter such as mass flow and a third microprocessor to arbitrate real-time communications. Although the triple microprocessor structure consumes more current than the dual micro structure, real-time communications protocols allow for a larger power consumption budget than existing 4–20 mA compatible protocols.

Transmitter 2 has a positive terminal 84 and a negative terminal 86, and when configured as a flow computer, is either powered by battery while logging up to 35 days of mass flow data, or connected via remote telephone lines, wireless RFI link, or directly wired to a data collection system. When transmitter 2 is configured as a high performance multivariable transmitter, terminals 84,86 are connected to two terminals of a controller 88 (modelled by a resistor and a power supply). In this mode, transmitter 2 communicates according to a HART communications protocol, where controller 88 is the master and transmitter 2 is a slave. Other communications protocols common to the process control industry may be used, with appropriate modifications to microprocessor code and to encoding circuitry. Analog loop current control circuit 100 receives an analog signal from a power source and provides a 4–20 mA current output representative of the differential pressure. HART receive circuit 102 extracts digital signals received from controller 88 over two wire circuit 82, and provides the digital signals to a circuit 104 which demodulates such signals according to the HART protocol and also modulates digital signals for transmission onto two wire circuit 88. Circuit 104 is a Bell 202 compatible modem, where a digital one is encoded at 1200 Hz and a digital zero is encoded at 2200 Hz. Requests for process variable updates and status information about the integrity of transmitter 2 are received via the above described circuitry by microprocessor 80, which selects the requested process variable from SPI bus 76 and formats the variable according to the HART protocol for eventual transmission over circuit 82.

Diodes 90,92 provide reverse protection and isolation for circuitry within transmitter 2. A switching regulator power supply circuit 94, or a flying charged capacitor power supply design, provides 3.5 V and other reference voltages to circuitry on output board 78, sensor digital board 67 and to sensor analog board 68.

Although the present invention has been described with reference to preferred embodiments, workers skilled in the art will recognize that changes may be made in form and detail without departing from the spirit and scope of the invention.

What is claimed is:

1. A two wire transmitter transmitting mass flow of a fluid, comprising:

a first pressure sensor for sensing a differential pressure of the fluid;

a second pressure sensor for sensing a line pressure of the fluid;

an input for receiving a temperature variable representative of process grade temperature;

a compensation microprocessor receiving the temperature variable and signals from the first and second pressure sensors and providing a compensated differential pressure output and a compensated line pressure output;

a mass flow microprocessor receiving the compensated differential pressure output and the compensated line pressure signal output and providing an output representative of mass flow; and a communications microprocessor receiving the mass flow output for formatting the mass flow output and coupling to a two wire circuit which powers the transmitter.

2. The transmitter of claim 1 where the first pressure sensor is a capacitance based pressure sensor and the second pressure sensor is a strain gauge sensor.

3. The transmitter of claim 1 where the first and the second pressure sensors sense pressure by a change in capacitance.

4. A two wire transmitter for sensing process variables representative of a process, comprising:

a module housing comprising a first pressure sensor for providing a first process variable representative of a differential pressure, a second pressure sensor for providing a process variable representative of a relative pressure and means for receiving a third process variable representative of a process grade temperature, the module housing including a digitizer for digitizing the process variables, and a microprocessor for compensating the digitized process variables;

a temperature sensor in the transmitter compensating at least one of the sensed process variables; and an electronics housing coupled to the module housing and to a two wire circuit over which the transmitter receives power, the electronics housing including microcomputer means calculating mass flow based upon differential pressure, relative pressure and process grade temperature of the process and for formatting and for coupling mass flow to the two wire circuit.

5. The transmitter of claim 4 where the temperature sensor for compensation is located in the sensor module.

6. The transmitter of claim 4 where the differential pressure sensor senses pressure as a function of a change in capacitance, and the line pressure sensor senses pressure as a function of a change in resistance.

7. The transmitter of claim 4 where the differential and the line pressure sensors sense pressure as a function of a change in capacitance.

* * * * *

UNITED STATES PATENT AND TRADEMARK OFFICE
CERTIFICATE OF CORRECTION

PATENT NO. : 5,495,769

DATED : March 5, 1996

INVENTOR(S) : David A. Broden et al.

It is certified that error appears in the above-indentified patent and that said Letters Patent is hereby corrected as shown below:

Col. 3, line 16, please change "annular" to --annubar--.

Col. 5, line 22, please change

" $q_m = 590.006\ C_d E_{vy1} d^2 \frac{\sqrt{Z_{sgr} P_1 h_w}}{Z_{f1} T_f}$ " to -- $q_m = 590.006\ C_d E_v y_1 d^2 \frac{\sqrt{Z_s g_r P_1 h_w}}{Z_{f1} T_f}$ --.

Signed and Sealed this

Twenty-first Day of January, 1997

*Attest:*

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,495,769
DATED : March 5, 1996
INVENTOR(S) : David A. Broden et al.

It is certified that error appears in the above-indentified patent and that said Letters Patent is hereby corrected as shown below:

Col. 5, line 22, please change

" $q_m = 590.006\, C_d E_v y_1 d^2 \frac{\sqrt{Z_s g_r P_1 h_w}}{Z_{f1} T_f}$ " to -- $q_m = 590.006\, C_d E_v y_1 d^2 \sqrt{\frac{Z_s g_r P_1 h_w}{Z_{f1} T_f}}$ --.

Signed and Sealed this

Eleventh Day of November, 1997

Attest:

Bruce Lehman

BRUCE LEHMAN

Attesting Officer

*Commissioner of Patents and Trademarks*